Figure 1:
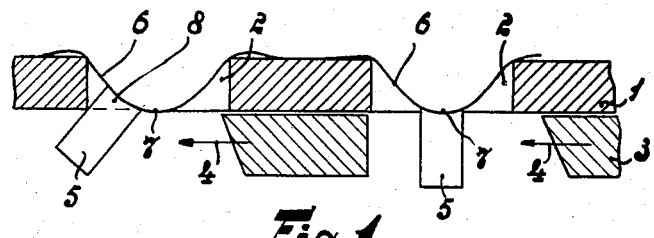

March 17, 1959  G. STARRE  2,877,548

DRY SHAVER SHEAR PLATE AND CUTTER CONSTRUCTION

Filed April 4, 1955

INVENTOR
GERRIT STARRE

BY *[signature]*

AGENT

United States Patent Office 2,877,548
Patented Mar. 17, 1959

2,877,548

DRY SHAVER SHEAR PLATE AND CUTTER CONSTRUCTION

Gerrit Starre, Eindhoven, Netherlands, assignor, by mesne assignments, to North American Philips Company, Inc., New York, N. Y., a corporation of Delaware Application April 4, 1955, Serial No. 499,130

Claims priority, application Netherlands April 2, 1954

2 Claims. (Cl. 30—43)

This invention relates to dry-shaving apparatus and more particularly to a novel shear plate therefor.

Known shear plates have apertures for passing hairs therethrough. Such a shear plate is usually applied with one side to the skin so that the hairs to be shaved penetrate through the apertures and are cut on the other side of the shear plate by a cutting member co-operating with the shear plate. The thickness of the shear plate and the width of the apertures are a measure for the length of the hairs remaining on the skin after cutting. The thickness of the shear plate and the width of the apertures are preferably chosen to be such that the skin penetrates into the apertures of the shear plate to an extent such that the skin part penetrating farthest into the apertures lies just in the plane of the shear plate over which the cutting member is moved. The skin part penetrating farthest lies, as a rule, in the center of the apertures. At this area the hairs can thus be cut in the plane of the skin. However, just these hairs are not supported by a boundary of the apertures of the shear plate, whereas the hairs supported in this manner are not lying on the skin part penetrating farthest into the apertures. This results in that both the unsupported hairs, owing to deflection, and the supported hairs are cut at some distance from the surface of the skin.

According to the invention which has a principal object of overcoming the aforesaid disadvantages, a constant surface area of different sections of an aperture parallel to the surface of the shear plate is provided, the direction in which the aperture extends in the direction of thickness of the shear plate is at an angle differing from 90° to the surface of the shear plate.

Thus, the hairs penetrating farthest into the apertures can be supported by the boundaries of the apertures, so that they can be cut in the plane of the skin. Moreover, on the side of the shear plate adjacent the skin the apertures are bounded partly by acute angles so that a sort of rasping effect is obtained. The hairs lying flat on the skin are thus lifted and introduced into the apertures.

The apertures in accordance with the invention may be obtained in a simple manner in accordance with the conventional apertures at right angles to the shear plate, for example by milling slots or drilling circular apertures. For the manufacture of the apertures according to the invention it is only required to vary the position of the tools relative to the shear plate.

- The shear plate according to the invention also permits of enlarging the apertures, since the slanting boundaries can support also the hairs on the skin part penetrating farthest into the apertures. Therefore, the thickness of the shear plate may be increased. This results in an improved cutting effect after a period of time, since a thin shear plate is liable to sag, so that irregular wear of the shear plate and the cutting member may occur at their contact surfaces.

The best shaving results are obtained, if the direction in which an aperture extends in the direction of thickness of the shear plate, is at an angle of at least 45°, preferably 60° to the surface of the shear plate. In this manner a sufficient number of apertures may be provided per surface unit. Although the acute angles bound partly the apertures on the side of the shear plate adjacent the skin, the shear plate is smoothly movable over the skin because these acute angles are rounded off.

In order to obtain a favourable shaving operation, the direction of movement of the cutting member of a dry-shaving member comprising a shear plate according to the invention and a cutting member with cutting edges arranged behind the former which coincides with the projection of the direction in which the apertures extend in the direction of the thickness of the shear plate on the surface of the shear plate in a manner such that the cutting edges of the cutting member co-operate with the sharp cutting edges of the shear plate to obtain a cutting effect. Thus, the hairs penetrating farthest into the apertures of the shear plate are cut off by the moving member co-operating with the parts of the shear plate adjacent these hairs.

The shear plate according to the invention, in which the thickness, as stated above, may be chosen to be larger than the conventional thickness without any objection so that the apertures may be enlarged accordingly permitting of obviating the disadvantage inherent in known dry-shaving apparatus with respect to the difference in elasticity of the skin with different people and at different areas of the skin. With respect to these differences the size of the apertures and the thickness of the shear plate are chosen to be such that the most elastic skin can penetrate into the apertures to an extent such that the skin top lies just in the plane of the shear plate over which the cutting member moves. Less elastic skin parts penetrate into the apertures of such kind of shaving apparatus to a smaller extent, so that the hairs on these skin parts can be cut off only at some distance from the skin surface. This is required, since otherwise the elastic skin parts would be cut off with the hairs.

According to a further aspect of the invention, with a dry-shaving apparatus comprising a shear plate according to the invention behind which a moving cutting member with cutting edges is provided, the cutting member may be driven in a rocking movement with a motion component at right angles to the surface of the shear plate, the cutting edges being moved in the apertures of the shear plate. It is thus not possible to damage the skin since due to the movement of the cutting member the skin penetrated into the apertures is pressed out of them, although the hair is cut off. The cutting edges co-operate in this case with that boundary or that part of the boundaries of the apertures of which the angle to the inner surface of the shear plate is acute.

With reference to a few figures, showing a few embodiments of the present invention, the invention will be described more fully.

Figure 2:
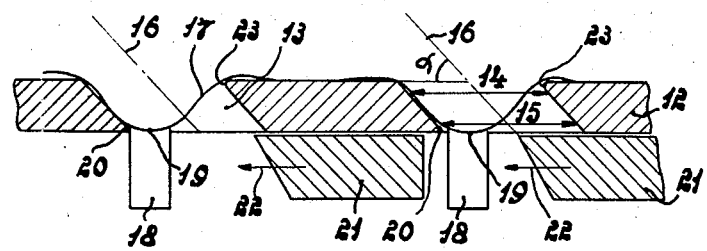
Figure 3:
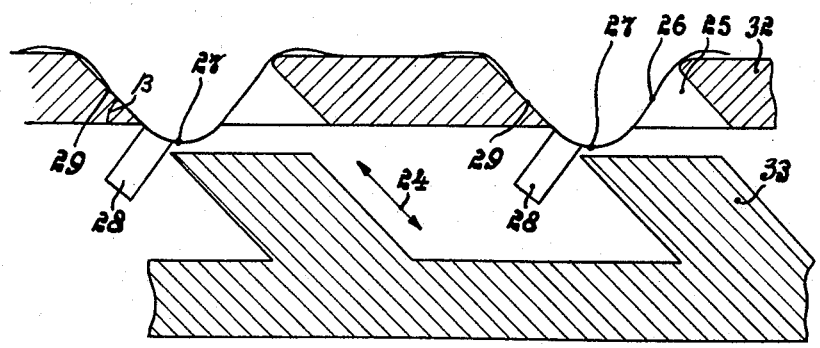

Fig. 1 is a cross-sectional view of a known shear plate with the cutting member co-operating therewith, Fig. 2 is a cross-sectional view of a shear plate according to the invention with a cutting member co-operating therewith, Fig. 3 is a cross-sectional view of a shear plate according to the invention with a cutting member co-operating therewith of which the motion component is at right angles to the surface of the shear plate.

Figure 4:
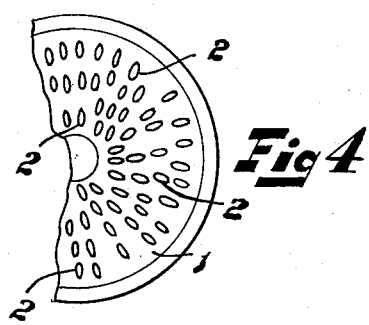

Fig. 4 is a partial top plan view of the shear plate constructed in accordance with the present invention showing the cylindrical apertures for the reception of the skin hairs.

Referring to the prior art structure of Fig. 1, a shear plate 1 is illustrated the cross-section of which extends in apertures 2. The apertures 2 may, for example, have a circular or an elongated shape in all possible variations. On the bottom side of the shear plate 1 lie cutting edges 3 of the cutting member which is driven in the direction of the arrows 4. The thickness of the shear plate 1 and the size of the apertures 2 are chosen to be such that a skin part 6 with hairs thereon penetrates into the apertures 2 to an extent such that the farthest penetrated top 7 lies just in the plane of the shear plate 1, over which the cutting edges 3 are moved. A hair 5 on the top 7 of the skin, as is shown in the right-hand part of the figure can thus be cut off by the cutting edge 3 very near the skin; however, this hair is not supported by the boundaries of the aperture 2, so that under the action of the cutting edge 3 this hair can be deflected, and the shaving effect is affected adversely. The left-hand part of the figure illustrates what happens when hair 5 is not supported. Thus, it is evident that the hair 5 does not lie on the top 7 so that a part 8 of this hair will remain on the face and will not be shaved off by the cutting edges 3. By choosing the apertures 2 to be smaller and by reducing accordingly the thickness of the shear plate 1, the aforesaid disadvantages could be obviated; however, the thickness of the shear plate is subjected to minimum limits in view of the mechanical rigidity.

Referring now more particularly to Fig. 2 which shows a shear plate 12 according to the invention in the same sectional view as in Fig. 1. The apertures 13, of which the cross-sectional view shown in the figure is taken through the axis, have a surface area in a section parallel to the surface of the shear plate, which is constant viewed in the direction of the different thicknesses of the shear plate. Figure 2 shows two lines of intersection 14 and 15 of such sectional views with the plane of the drawing. The lengths of these lines 14 and 15 are equal. Moreover, the apertures extend in the direction 16 in the direction of thickness of the shear plate 12. The direction 16 is at an angle $\alpha$ to the surface of the shear plate, $\alpha$ being smaller than 90°. As in Fig. 1, Fig. 2 shows a skin part 17. From Fig. 2 it is evident that hairs 18 lying on the farthest penetrated top 19 of the skin are supported by the boundary 20, so that an effective cutting operation between the shear plate and the cutting edges 21 may be obtained. The cutting edges move in the direction of the arrows 22 which coincides with the projection of the direction 16 on the surface of the shear plate. The acute angular surfaces 23 bounding the apertures 13 on the outer side of the shear plate 12 are rounded off.

Fig. 3 shows a shear plate 32, which is completely identical with the shear plate 12 shown in Fig. 2; however, the scale of the Fig. 2 is smaller. With the shear plate 32 co-operates a cutting member 33, of which the direction of movement is indicated by the arrows 24. Since apertures 25 in the shear plate 32 are chosen to be larger than usual, the skin 26 penetrates farther into the apertures, and due to the motion of the cutting member 33, the tops 27 of the skin 26 are not liable to be cut off: they are urged back into the apertures 25 while the hairs 28 are cut off by the co-operation between the cutting member 33 and the boundary 29, of which the angle $\beta$ is acute.

The apertures 2 as seen in Fig. 4 are illustrated in the shape of an ellipse, however, it is not intended to be restricted to this particular form since any configuration or cross-section may be employed as long as the apertures themselves are cylindrical in the direction perpendicular to the plane of the shear plate.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A shear plate for use in dry-shaving apparatus and having a plurality of face-skin receiving apertures therein wherein a part of said face skin abuts only against a portion of the wall of each of said apertures, the walls of said apertures being parallel at diametrically opposite points thereof, and the walls of said apertures being at an angle less than 90° with the bottom surface of said shear plate adjacent to said portion of the wall of each of said apertures, the longitudinal axis of each of said apertures being substantially transverse to the plane of said shear plate.

2. A shear plate for use in dry-shaving apparatus as claimed in claim 1 wherein said apertures are cylindrically shaped.

References Cited in the file of this patent

UNITED STATES PATENTS

| 2,279,102 | Altemus | Apr. 7, 1942 |
| 2,325,606 | Hanley | Aug. 3, 1943 |

FOREIGN PATENTS

| 977,522 | France | Nov. 15, 1950 |